United States Patent

Golja

[15] 3,702,469
[45] Nov. 7, 1972

[54] ALARM CIRCUIT FOR INDICATING FAILURE IN REDUNDANT POWER SUPPLIES

[72] Inventor: Joseph Golja, Redwood City, Calif.
[73] Assignee: GTE Automatic Electric Laboratories, Incorporated, Northlake, Ill.
[22] Filed: Sept. 3, 1971
[21] Appl. No.: 177,765

[52] U.S. Cl. .............................. 340/248 A, 340/333
[51] Int. Cl. ............................................. F08b 21/00
[58] Field of Search ............... 340/248 A, 248 R, 411

[56] References Cited

UNITED STATES PATENTS 3,431,557   3/1969   Thomas ................. 340/248 A

Primary Examiner—Thomas B. Habecker
Attorney—K. Mullerheim et al. and Theodore C. Jay, Jr.

[57] ABSTRACT

The output voltages of a pair of dual polarity power supplies are coupled together through associated solid state alarm-sense circuits to common utilization equipment. Each alarm-sense circuit comprises a pair of switching transistors connected to associated voltage dividers that are connected across the output lines of a power supply; a pair of transistors connected in parallel; and a lamp. The output lines supporting the same polarity voltages are connected together through steering diodes that prevent one supply loading the other. The switching transistors detect increases and decreases in supply voltages that are greater than prescribed amounts. In each alarm-sense circuit, the parallel connected transistors are responsive to the operation of the switching transistors to light the lamp to indicate failure of the associated power supply. Output signals of the alarm-sense circuits are connected to a bell for also producing an audio alarm when a power supply fails. A zener diode is connected to a voltage divider for causing a switching transistor to detect a supply failure when the absolute values of the opposite polarity supply voltages from an associated power supply increase at the same rate.

7 Claims, 3 Drawing Figures

PATENTED NOV 7 1972 3,702,469

INVENTOR.
JOSEPH GOLJA

BY

Russell A. Cannon

BY AGENT

ALARM CIRCUIT FOR INDICATING FAILURE IN REDUNDANT POWER SUPPLIES

BACKGROUND OF INVENTION

This invention relates to alarm circuits and more particularly to alarm circuits for monitoring the operation of and indicating failure of redundant power supplies. A power supply failure, as that term is used herein, is defined as a change in an output voltage of a power supply in either direction that is greater than a prescribed amount such as 10 percent.

In certain applications it is desirable to insure that a system does not become inoperative as a result of lack of electrical power. In such systems an inoperative standby power supply cannot be used since the system would be inoperative from the time the supply failure is detected to the time the auxiliary supply is energized and connected in the system. Redundant power supplies are employed in such applications wherein a pair of power supplies that are both on are connected to a common load with the power supply having the higher voltage supplying current to the load. In the prior art, monitor circuits associated with the power supplies employ relays as sense and control elements for producing an alarm indicating failure of a particular supply so that it can be repaired before the system becomes inoperative. Relays are relatively large and expensive and have poor sensitivity in that they sense catastrophic failure of a power supply rather than relatively small changes in the output voltage thereof.

An object of this invention is the provision of an improved alarm circuit for monitoring the operation of redundant power supplies.

Another object is the provision of an alarm circuit that is physically small and inexpensive and senses small changes in the output voltage of a power supply.

DESCRIPTION OF DRAWING

This invention will be more fully understood from the following detailed description thereof together with the drawing in which.

DESCRIPTION OF PREFERRED EMBODIMENTS

Figure 1:
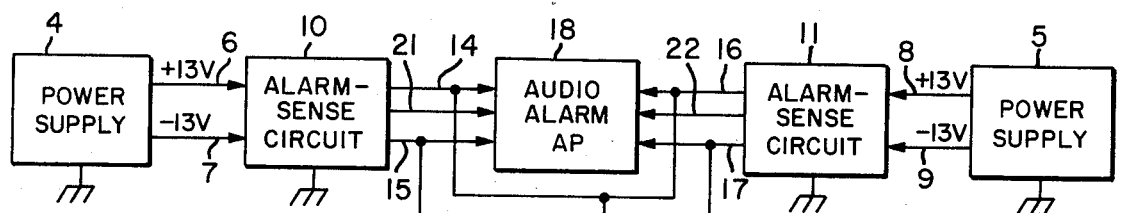
FIG. 1 is a block diagram illustrating connection of equipment embodying this invention to redundant power supplies.

Referring now to FIG. 1, redundant power supplies 4 and 5 each produce constant DC output voltages of ±13V, for example, on lines 6, 7 and 8, 9, respectively. These output voltages of supplies 4 and 5 are connected through associated alarm-sense circuits 10 and 11 and lines 14, 15 and 16, 17, respectively, to audio alarm apparatus 18. The output voltages of the power supplies are combined and applied on lines 19 and 20 to utilization apparatus (not shown). The power supplies and alarm-sense circuits are each connected to a common ground reference potential. Outputs of alarm-sense circuits 10 and 11 are also applied on associated lines 21 and 22 to the audio alarm apparatus for controlling operation of the latter.

Figure 2:
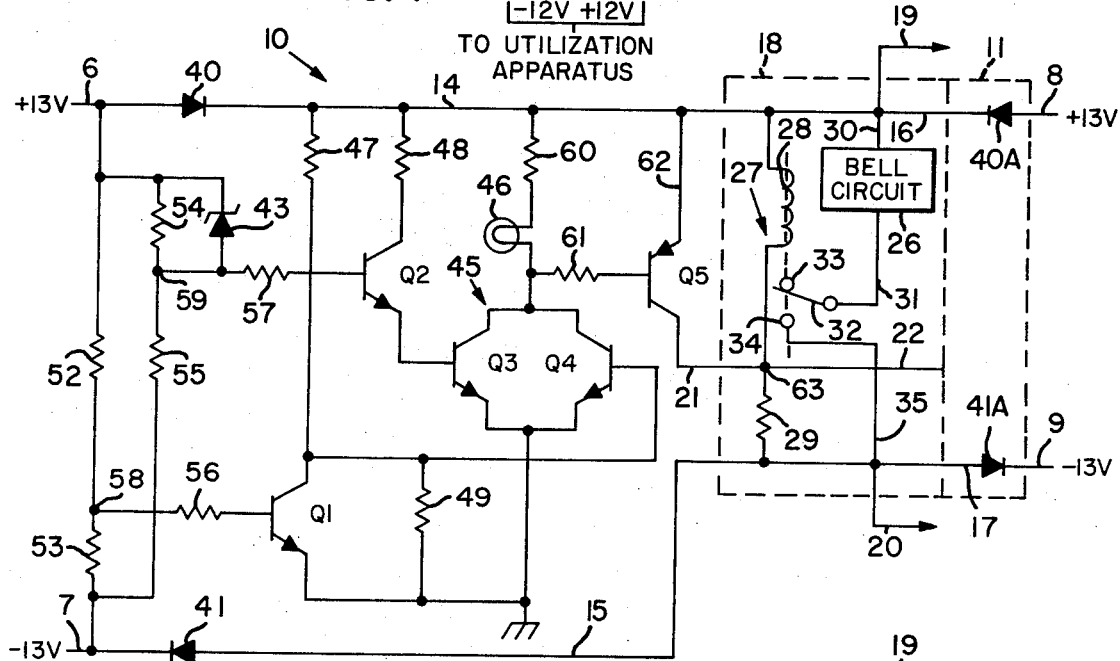
FIG. 2 is a circuit diagram of one embodiment of this invention.

Referring now to FIG. 2, audio alarm apparatus 18 comprises a bell circuit 26, and a relay 27 having a coil 28 connected in series with a current limiting resistor 29 across the outputs of the power supplies. One side of the bell circuit 26 is connected on line 30 to the positive supply voltage lines 14 and 16. The other side of circuit 26 is connected on line 31 to the movable arm 32 of the relay. When at least one power supply is operating, coil 28 is energized and arm 32 is connected to the relay contact point 33 which is floating. When coil 28 is de-energized, arm 32 is connected to relay contact point 34 which is connected through line 35 to the negative supply voltage to ring the bell.

Since alarm-sense circuits 10 and 11 are identical, only circuit 10 will be described in detail in relation to the circuit diagrams in FIGS. 2 and 3 where similar components are designated by the same reference characters. Again referring to FIG. 2, the circuit 10 comprises steering diodes 40 and 41, zener diode 43, switching transistors $Q_1$ and $Q_2$, transistors $Q_3$ and $Q_4$ which are connected in parallel, lamp 46, and switching transistor $Q_5$. Steering diodes 40 and 41 (and also diodes 40A and 41A of circuit 11) are connected in series with the positive and negative, respectively, output voltage lines of the power supplies. The steering diodes are employed to couple the output voltages of the two power supplies together and to lines 14–17, and to isolate the power supplies from each other. Thus, if one supply fails it will not load the internal circuitry of and affect operation of the other power supply. The power supply with the largest absolute value of output voltage will conduct through the associated steering diode and supply current to the utilization apparatus. The voltages on lines 19 and 20 are lower than ±13V output voltages from the supplies by the diode voltage drops.

The $Q_1$ and $Q_2$ collector electrodes are connected through associated resistors 47 and 48 to the positive supply voltage line 14 where they can receive voltage from either power supply. A resistor 49 is connected between the $Q_1$ collector and emitter electrodes, the former electrode being connected to the $Q_4$ base electrode for controlling operation of $Q_4$ and the latter electrode being connected to ground as are the $Q_3$ and $Q_4$ emitter electrodes.

A pair of voltage dividers comprising resistors 52, 53 and 54, 55 are connected in shunt across the output voltage lines 6 and 7 of power supply 4. The voltage dividers are isolated from the output voltages of the other supply 5 by steering diodes 40 and 41. Zener diode 43 is connected in parallel with resistor 54. The $Q_1$ and $Q_2$ base electrodes are connected through current limiting resistors 56 and 57 to the junctions 58 and 59, respectively, of the voltage dividers which bias $Q_1$ on and $Q_2$ off. The $Q_2$ emitter electrode is connected to the $Q_3$ base electrode to control operation of the latter transistor.

Lamp 46 and collector resistor 60 are connected in series between the $Q_3$ and $Q_4$ collector electrodes and the positive supply voltage on line 14. The $Q_5$ base electrode is connected through resistor 61 to the collectors of $Q_3$ and $Q_4$. The $Q_5$ emitter electrode is connected on line 62 to the positive supply voltage line 14. The $Q_5$ collector electrode is connected through output line 21 to junction 63 so that $Q_5$ is essentially in parallel with the relay coil 28.

In operation, $Q_1$ is saturated and the other transistors are cut off when the ±13V output voltages of power supply 4 vary less than 10 percent. The operation of $Q_1$ and $Q_2$ is controlled by the bias potential at the junctions 58 and 59 of the voltage dividers. The bias levels at which $Q_1$ and $Q_2$ change conduction states is a function of the base-emitter drops of these transistors and $Q_3$ and the values of resistors 56 and 57. Thus, these bias levels may not be symmetrical, i.e., both may not be different from the supply voltage by the same amount.

Consider that power supply 4 fails by either +13V going less positive by more than 1.3V, or −13V going more negative by more than 1.3V, or both. This causes the potential at junction 58 to become more negative than the sum of the base-emitter drop of $Q_1$ and the voltage across resistor 56, and to cut off transistor $Q_1$. The resultant increase in the $Q_1$ collector voltage saturates $Q_4$ to light lamp 46 to indicate that power supply 4 has failed. The decrease in $Q_4$ collector voltage causes $Q_5$ to conduct to short circuit and de-energize coil 28 to connect circuit 26 to the −13V lines 15, 17 and ring the bell. In a similar manner, if power supply 4 fails by either +13V becoming more positive by more than 1.3V, or −13V becoming less negative by more than 1.3V, or both, $Q_2$ is caused to conduct by the potential at junction 59. This causes $Q_3$ to conduct to light the lamp, saturate $Q_5$, and ring the bell.

If the ±13V output voltages of supply 4 both increase in absolute value (i.e., +13V goes more positive and −13V goes more negative) at the same rate, the voltage at junction 59 remains essentially constant. Thus, $Q_2$ tends to remain cut off although the supply potential has changed more than the prescribed amount. When the potential across resistor 54 reaches the zener breakdown voltage, however, diode 43 conducts to raise the junction 59 potential to drive $Q_2$ into conduction. This causes $Q_3$ and $Q_5$ to also conduct to light lamp 46 and ring the bell in circuit 26.

Figure 3:
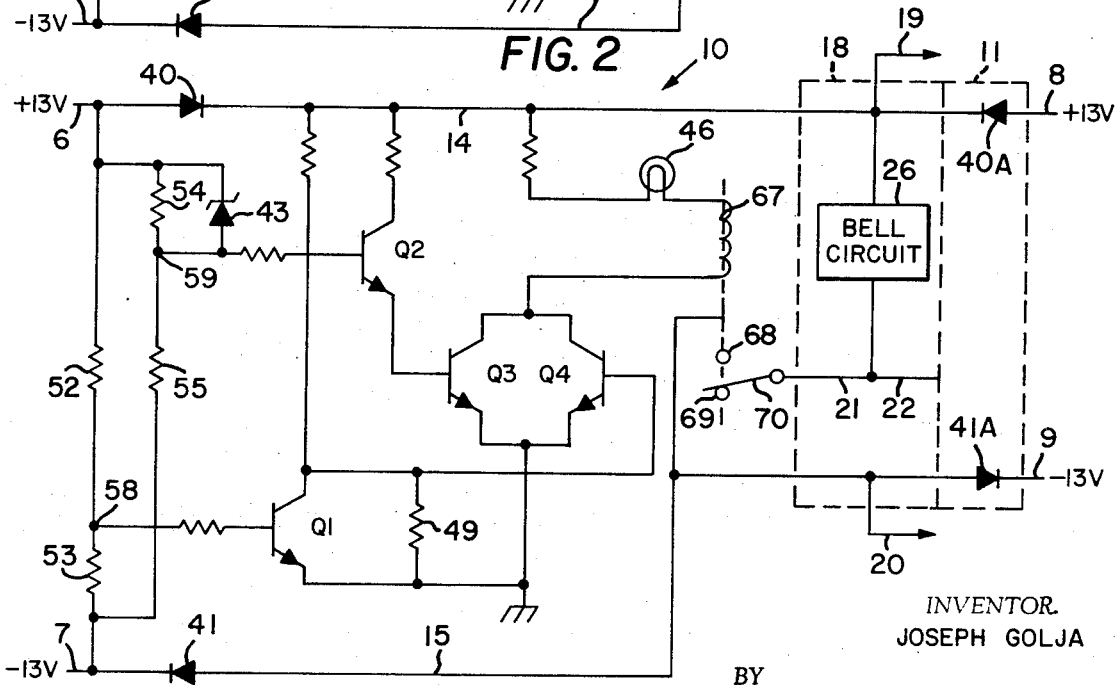
FIG. 3 is a circuit diagram of an alternate embodiment of this invention.

In the alternate embodiment of the invention illustrated in FIG. 3, the switching transistor $Q_5$ is omitted from alarm circuit 10 and a relay coil 67 is connected in series with lamp 46 and the collectors of $Q_3$ and $Q_4$. The relay contact point 68 is connected to the −13V line 15 instead of the floating contact point 69 as in FIG. 2. The arm 70 of the relay is connected on line 21 to bell circuit 26 of the audio alarm apparatus. Thus, in contrast to the operation of the relay in FIG. 2, relay coil 67 is de-energized during normal operation and is energized during conduction of $Q_3$ or $Q_4$ by collector current thereof to ring the bell of circuit 26.

What is claimed is:

1. Apparatus for indicating failure of redundant power supplies that includes a pair of DC power supplies, each supply having a pair of output lines supplying output voltages of opposite polarity, comprising
   a pair of alarm circuits;
   means for connecting each alarm circuit across the output lines of a different associated power supply; and
   means for combining output signals from said alarm circuits for producing common output voltages of opposite polarity;
   each of said alarm circuits comprising
   a first transistor of one type having a collector electrode receiving the output voltages of one polarity from the power supplies, having an emitter electrode connected to a ground reference potential and having a base electrode;
   first bias means connected across the output lines of the associated power supply and to said first transistor base electrode for biasing said first transistor on during quiescent conditions when the power supplies operate satisfactorily;
   second bias means connected across the output lines of the associated power supply;
   a lamp; and
   second and third transistors of the one type having emitter electrodes connected to the ground reference potential; having base electrodes electrically connected to the first transistor collector electrode and to said second bias means, respectively, for biasing said second and third transistors off during quiescent conditions; and having collector electrodes connected in series through said lamp to receive the one polarity voltages from the power supplies;
   said first transistor being cut off and causing conduction of said second transistor and illumination of said lamp for indicating failure of the associated power supply when either the relative magnitude of the one polarity voltage, or the relative magnitude of the other polarity voltage, or both therefrom change in one direction an amount greater than a prescribed limit;
   said third transistor conducting and causing illumination of said lamp for indicating failure of the associated power supply when either the relative magnitude of the one polarity voltage, or the relative magnitude of the other polarity voltage, or both therefrom change in the other direction an amount greater than a prescribed limit.

2. Apparatus according to claim 1 wherein each alarm circuit includes a pair of steering diodes, each diode being connected in series with a different output line of the associated power supply, said first, second and third transistor collector electrodes being connected to the one side of one diode that is spaced from the one output line supplying the one polarity voltage.

3. Apparatus according to claim 2 including means responsive to current in the common collector circuits of said second and third transistors for producing an audio indication of failure of a power supply.

4. Apparatus according to claim 3 wherein said second bias means comprises a resistive voltage divider connected across the supply output lines and a fourth transistor of the one type having a collector electrode electrically connected to the one side of the one diode, having a base electrode electrically connected to the voltage divider, and having an emitter electrode electrically connected to the base electrode of said third transistor, said fourth transistor being cut off during quiescent operation and conducting for causing said third transistor to conduct to illuminate said lamp to indicate failure of the associated power supply when either the relative magnitude of the one polarity voltage, or the relative magnitude of the other polarity voltage, or both therefrom change in the other direction an amount greater than a prescribed limit.

5. Apparatus according to claim 4 wherein said second bias means includes a zener diode electrically connected between said fourth transistor base electrode and the output line supporting the one polarity voltage from the associated supply for causing conduction of this transistor when the opposite polarity voltages therefrom each increase in absolute value more than a prescribed amount at the same rate.

6. Apparatus according to claim 5 wherein each alarm circuit comprises a relay including a coil connected in series with said second and third transistor collector electrodes and said lamp, and said audio indication producing means comprises an audio device responsive to operation of said relay for producing an audio indication of failure of a power supply.

7. Apparatus according to claim 5 wherein said audio indication producing means comprises an audio device and a relay electrically connected to the sides of said steering diodes away from the supplies and to said audio device, said relay being normally energized to deactivate said audio device; and wherein said alarm circuits each comprise a fifth transistor of the opposite conduction type electrically connected across said relay and to said second and third transistor collector electrodes, said fifth transistor being responsive to conduction of either of said second and third transistors for conducting to short circuit and deenergize said relay to activate said audio device to produce an audio indication of failure of a power supply.

* * * * *